United States Patent
Asano et al.

(10) Patent No.: US 7,613,841 B2
(45) Date of Patent: Nov. 3, 2009

(54) SYSTEMS AND METHODS FOR REDUCING DATA STORAGE IN DEVICES USING MULTI-PHASE DATA TRANSACTIONS

(75) Inventors: Shigehiro Asano, Kanagawa (JP); Thuong Truong, Austin, TX (US)

(73) Assignees: Kabushiki Kaisha Toshiba, Tokyo (JP); International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/422,646

(22) Filed: Jun. 7, 2006

(65) Prior Publication Data

US 2007/0288672 A1     Dec. 13, 2007

(51) Int. Cl.
    *G06F 3/00*     (2006.01)
(52) U.S. Cl. ............... 710/6; 710/54; 710/59; 710/110; 714/749
(58) Field of Classification Search ............ 710/110, 710/5, 6, 52, 54, 59; 714/749; 370/235, 370/331, 395.21, 400
See application file for complete search history.

(56) References Cited

U.S. PATENT DOCUMENTS

| | | | |
|---|---|---|---|
| 5,634,073 A * | 5/1997 | Collins et al. ............ | 710/5 |
| 5,951,706 A * | 9/1999 | Benner ............ | 714/749 |
| 5,961,659 A * | 10/1999 | Benner ............ | 714/749 |
| 6,237,067 B1 * | 5/2001 | Eberhard et al. ............ | 711/151 |
| 6,487,643 B1 * | 11/2002 | Khare et al. ............ | 711/150 |
| 6,845,237 B2 * | 1/2005 | Moulsley ............ | 455/422.1 |
| 7,068,605 B2 * | 6/2006 | Cain et al. ............ | 370/235 |
| 7,075,911 B2 * | 7/2006 | Bernhard et al. ............ | 370/331 |

OTHER PUBLICATIONS

Khandelia et al. Contention-Conscious Transaction Ordering in Multiprocessor DSP Systems. IEEE Transactions on Signal Processing. vol. 54, No. 2, Feb. 2006.*
Chadalapaka et al. SCSI Command Ordering Considerations with iSCSI. Internet Draft. Sep. 19, 2003.*
Mastellone et al. Master-Slave Synchronization with Switching Communication Through Passive Model-Based Control Design. Proceedings of the 2006 American Control Conference. IEEE. 2006.*
J. Tendler, IBM eserver Power4 System Microarchitecture, Oct. 1, 2001.

* cited by examiner

*Primary Examiner*—Mark Rinehart
*Assistant Examiner*—Matthew D Spittle
(74) *Attorney, Agent, or Firm*—Law Offices of Mark L. Berrier

(57) ABSTRACT

Systems and methods for enforcing in-order execution of commands sent from a master device to a slave device, where it is not necessary to provide a data buffer to store data associated with commands that are delayed to enforce in-order execution. In one embodiment, when a slave receives an execution synchronization command from a master, it determines whether its command queue contains unissued commands associated with master. If the command queue contains unissued commands, the slave issues a retry responsive to the execution synchronization command. If the command queue does not contain unissued commands, the slave issues an acknowledgment responsive to the execution synchronization command. The master will retry the execution synchronization command until the previous commands have been completed. Because the slave does not queue up any commands that would be delayed by the execution synchronization command, it does not have to provide space to store any associated data.

20 Claims, 7 Drawing Sheets

SYSTEMS AND METHODS FOR REDUCING DATA STORAGE IN DEVICES USING MULTI-PHASE DATA TRANSACTIONS

BACKGROUND

1. Field of the Invention

The invention relates generally to communications between master and slave devices and more particularly to systems and methods for ensuring in-order execution of commands using execution-synchronization instructions.

2. Related Art

Modern high-performance computing systems may include multiple devices that perform the various functions of the computing system. For example, there may be multiple processors (which may act as masters, slaves, or both,) memories, input/output (I/O) devices, and the like. These different devices are typically connected to a bus to communicate with each other, transfer data, and so on. Because there may be many devices that are trying to communicate using the limited bandwidth of the bus, the communications between the devices should be as efficient as possible.

In order to support the high data bandwidth requirements in such a system, a split bus may be used. The split bus allows command and data phases of a data transaction to be decoupled. The decoupling of the command and data phases of the transaction allows multiple transactions to proceed concurrently and thereby avoids some of the latency that would otherwise be experienced in the transactions.

In a typical multi-phase transaction, a master device initiates the transaction by sending a command to a slave device via a bus. The slave device receives the command and, if the slave is able to accept the command, it sends an acknowledgment of the command to the master device. When the master device receives the acknowledgment, it knows that the command has been received and accepted by the slave. If, for example, the command is for a write transaction, the master device then puts the write data on the bus. When the slave device sees the data on the bus, it matches the data with the command and writes the data according to the command.

As noted above, this type of system allows multiple transactions to proceed concurrently. As a result, multiple commands may be sent to the slave device. The slave device therefore needs a buffer or queue in which the received (and acknowledged) commands can be stored until they can be serviced. For example, the slave device may receive several write commands before it receives data corresponding to any of the commands, so it must be able to retain the information for each command (e.g., the address to which the data will be written) until the corresponding data is received, and the transaction can be completed. It should be noted that the slave device may receive data for the commands in an order or other than the order in which the commands were received, and it can typically complete the transactions as the corresponding data is received.

In some systems, however, it may be necessary to provide a mechanism to ensure that some transactions are completed before others. One such mechanism is an execution-synchronization command. This command may be issued by a master device to ensure in-order execution of data transactions. In one embodiment, the master device may have a first set of transactions that need to be completed before a second set of transactions. In this case, the master device sends to the slave device commands for the first set of transactions, then an execution-synchronization command, then commands for the second set of transactions. Each of the commands is assumed to be acknowledged by the slave device in this order. The slave device then knows that it must complete all of the transactions in the first set (for which the commands were received prior to the execution-synchronization command) before it can begin executing any of the transactions in the second set (for which the commands were received after the execution-synchronization command.)

While this mechanism serves its intended purpose, it has the undesirable effect of increasing the amount of space required for the buffer in the slave device. Considering the example above, the slave device may receive the data corresponding to one or more of the second set of commands before it has completed all of the transactions for the first set of commands. This may be for a variety of reasons, such as the unavailability of the target to which the data is to be written. While the slave device is waiting to complete the first set of transactions, it must store the data which it has received for the second set of transactions. Thus, the slave device must have enough space to temporarily store not only the second set of commands, but also the data for these commands until it can be written to the appropriate target device.

Because a large amount of space is required to buffer data for the commands that cannot yet be executed, this can be a very expensive solution to the problem of having to perform transactions in order. This problem obviously becomes even worse when it is desired to increase the number of transactions that can be accommodated in buffer. It would therefore be desirable to provide a means for insuring in-order execution of data transactions that does not require that large amounts of data storage necessitated by the above mechanism.

SUMMARY OF THE INVENTION

One or more of the problems outlined above may be solved by the various embodiments of the invention. Broadly speaking, the invention includes systems and methods for enforcing in-order execution of commands sent from a master device to a slave device, where it is not necessary to provide a data buffer to store data associated with commands that are delayed to enforce in-order execution.

One embodiment comprises a method implemented in a slave device. When the slave receives an execution synchronization command, it determines whether its command queue contains unissued commands associated with the execution synchronization command (e.g., issued by the same master device.) If the command queue contains unissued commands, the slave issues a retry responsive to the execution synchronization command. If the command queue does not contain unissued commands, the slave issues an acknowledgment responsive to the execution synchronization command. If the master receives a retry responsive to the execution synchronization command, it retries the command later. In one embodiment, the slave determines the processor ID of the master that issued the execution synchronization command, and then checks for commands having the same processor ID to determine whether to return a retry or an acknowledgment to the master. Commands that are in the slave's command queue may be issued in any order. When these commands have been issued and the slave receives another execution synchronization command, it discards the execution synchronization command and sends an acknowledgment to the master. For commands other than a execution synchronization command, the slave sends corresponding acknowledgments if the commands can be stored in the slave's command queue, or retries if the commands cannot be stored in the queue.

Another embodiment comprises a system that uses a slave device that has a command queue for storing commands received from a master device, and control logic. The control logic is configured upon receipt of an execution synchronization command to determine whether the command queue contains unissued commands associated with the execution synchronization command. If the command queue contains unissued commands, the control logic causes the slave to issue a retry in response to the execution synchronization command. If the command queue does not contain unissued commands, the control logic causes the slave to issue an acknowledgment in response to the execution synchronization command. In one embodiment, the command queue stores a processor ID to identify which master originated the command. The control logic may then compare a processor ID received with the execution synchronization command to the unissued commands in the queue and disregard commands with different processor ID's in determining whether there are unissued commands in the queue.

Numerous additional embodiments are also possible.

BRIEF DESCRIPTION OF THE DRAWINGS

Various objects and advantages of the invention may become apparent upon reading the following detailed description and upon reference to the accompanying drawings.

Figure 1:
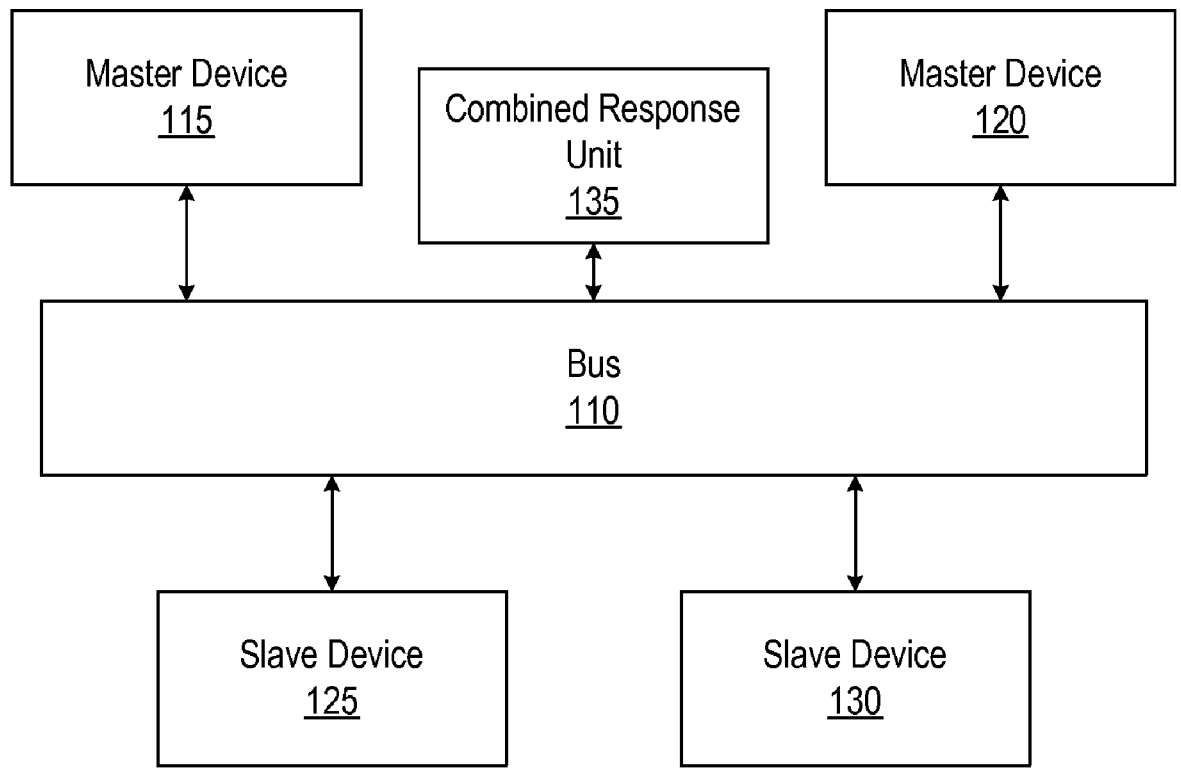
FIG. 1 is a block diagram illustrating a system having a bus that interconnects multiple master devices and slave devices in accordance with one embodiment.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for enforcing in-order execution of commands sent from a master device to a slave device, where it is not necessary to provide a data buffer to store data associated with commands that are delayed to enforce in-order execution.

In one embodiment, execution-synchronizing commands are used to provide a sequencing function in data transactions. One such command (an "eieio" command) is used to enforce a ordering of commands specified by a master device. More specifically, the eieio command is used to cause all of the commands sent by the master before the eieio command to be completed before any commands sent by the master after the eieio command are executed.

In prior art systems, a slave device receiving the eieio command acknowledges the command and stores the command in its command queue with the other commands it has received. The master, upon receiving the acknowledgment of the eieio command, may then send other commands to the slave, forcing the slave to determine the proper order of the commands and to enforce this ordering.

In the present system, when the slave receives the eieio command, it checks to see if there are unissued commands in the command queue that were received from the master that sent the eieio command. If there are unissued commands, the slave simply sends a retry response to the master. Because the eieio command is not acknowledged, the master will not send any other commands, as they might be executed out of order. The slave therefore does not have to provide buffer space to store data associated with these commands. Instead of sending the subsequent commands, the master retries the eieio command after some delay. This process is repeated until, when the slave receives the eieio command, there are no unissued commands from the master in the slave's command queue. In this event, the slave will not have to track any previously received commands to ensure in-order execution, so it sends an acknowledgment to the master. The master then sends the commands that were required to be executed after completion of the commands preceding the eieio command.

Modern high-performance computing systems may include multiple devices that perform the various tasks within a computing system. These different devices may, for example, be connected to a bus to communicate with each other, transfer data, and so on. Split buses are used to increase the effective bus bandwidth. A split bus allows the command and data phases of a data transaction to be decoupled. For instance, a master device may send a write command to a slave device, and then send the write data for the command after the slave device has acknowledged receipt of the command.

Referring to FIG. 1, a block diagram illustrating a system having a bus that interconnects multiple master devices and slave devices in accordance with one embodiment is shown. In this embodiment, the master and slave devices are configured to interact to perform various transactions. For example, one of master device 115 and master device 120 may generate a write or a read command to one of slave devices 125 and 130. The master device may then send data to or receive data from the slave device. Slave devices 125 and 130 are configured to each send a reply after receiving the command. The reply can be an acknowledgment, a retry, or a null reply. An acknowledgment indicates that the slave device can accept or send data, a null indicates that the slave is not a participant in the transaction, and a retry indicates that the requested transaction cannot be completed at that time and that the master device needs to retry sending the command at a later time.

Combined response unit 135 is configured to receive the replies from all of the slave devices, combine the replies, and broadcast a single, combined reply to all of the devices connected to the bus (including master devices and slave devices.) In one embodiment, combined response unit 135 is configured to broadcast a retry combined response if the reply from one or more of the slave devices is a retry. The retry reply may be generated by a slave device that is a direct participant in the transaction (e.g., the target device to which data is written or from which data is read,) or by a slave device that is an indirect participant (e.g., a device that observes the transaction and updates locally stored information based upon the transaction.) In either case, the device is not ready for the transaction to proceed, so a retry reply is generated to delay the transaction.

In this system, read and write transactions comprise multiple phases or steps. A write transaction, for example, may include phases in which: a master device generates a write command; the master device sends the command to a slave device; the slave device determines whether it can accept the command; the slave device sends to the master device a response indicating whether the slave device can accept the command; the master device, in response to receiving an acknowledgement from the slave device, retrieves the data to be sent to the slave device from its local storage; the master device sends the data to the slave device; the slave device receives the data; and the slave device stores the data in its local storage.

Similarly, a read transaction may include phases in which: a master device generates a read command; the master device sends the command to a slave device; the slave device determines whether it can accept the command; the slave device sends to the master device a response indicating whether the slave device can accept the command; the slave device sends the data to the master device; and the master device receives the data.

A tag scheme is used to associate the different phases of each transaction with each other. When generating a write or read command, for example, a master device is configured to generate a master tag (m-tag) that is associated with the generated command. The m-tag is sent to a slave device with the command. This m-tag is returned to the master device with any replies or data sent by the slave device. Using the returned m-tag, the master device can associate the received responses or data with the appropriate transaction. In one embodiment, the m-tag is an index into a command buffer in the master device where information about the transaction (such as the originally generated command) is kept. By using the m-tag as an index, information about the transaction can be quickly retrieved.

The slave devices are configured to receive commands and m-tags from the master devices. In one embodiment, the slave devices are configured to generate slave tags (s-tags) for associating the different phases of transaction with each other. The slave devices are configured to include the s-tag with some of the responses the slave devices send to other devices (such as master devices and combined response units) so that these other devices can include the s-tag with subsequent communications which the other devices send to the slave devices. The s-tag is an index into a command buffer in the slave device that generated it. The command buffer is used by the slave device to store information about the transaction. By using the s-tag as an index, information about the transaction can be quickly retrieved by the slave device.

In some conventional systems, operations/commands are performed by the slave in the same order that they are sent by the master. For example, in some conventional systems, slaves use first-in, first-out (FIFO) queues to store the commands as they are received. The commands may include different types of commands, such as read and write commands. The commands issue from the queue, one by one, in the same order in which they arrived at the slave. The data corresponding to each write command may arrive at the slave at any time after the associated write command, and must be stored by the slave until the command issues from the queue and can be written according to the parameters of the command (e.g., the address to which the data will be written.) If a write command reaches the head of the queue and is ready to be issued, but the corresponding data has not yet been received by the slave, the command queue is stalled until the data is available.

In some embodiments, this stalling of the queue can be avoided by allowing the commands in the queue to be executed out of order. Thus, if one of the write commands is stalled at the head of the queue because its data has not been received, but the data for a later write command has been received, the later write command can be issued. Out-of-order execution of commands, however, can lead to other problems such as having to ensure that certain commands are executed before others.

Consider, for example, a slave I/O device that uses control registers for some operations. In order to initiate an operation such as a DMA transfer, it may be necessary for a master device to write a start address and transfer length to registers A and B of the slave, and then read register C of the slave to actually initiate the transfer. The first two operations (writing registers A and B) must occur before the third operation (reading register C.) Some systems therefore implement execution synchronization commands. In one embodiment, an enforce-in-order-execution (eieio) command is defined. When the slave receives an eieio command, all of the commands received from the same master prior to the eieio command must be completed before any of the commands from the master which follow the eieio command can be issued. In the control register example, it would be necessary to insert an eieio command between the first two commands and the third command. In systems such as this, data buffer space must again be provided in the slave to store data which may be received by the slave before the corresponding command can be issued from the command queue.

Figure 2:
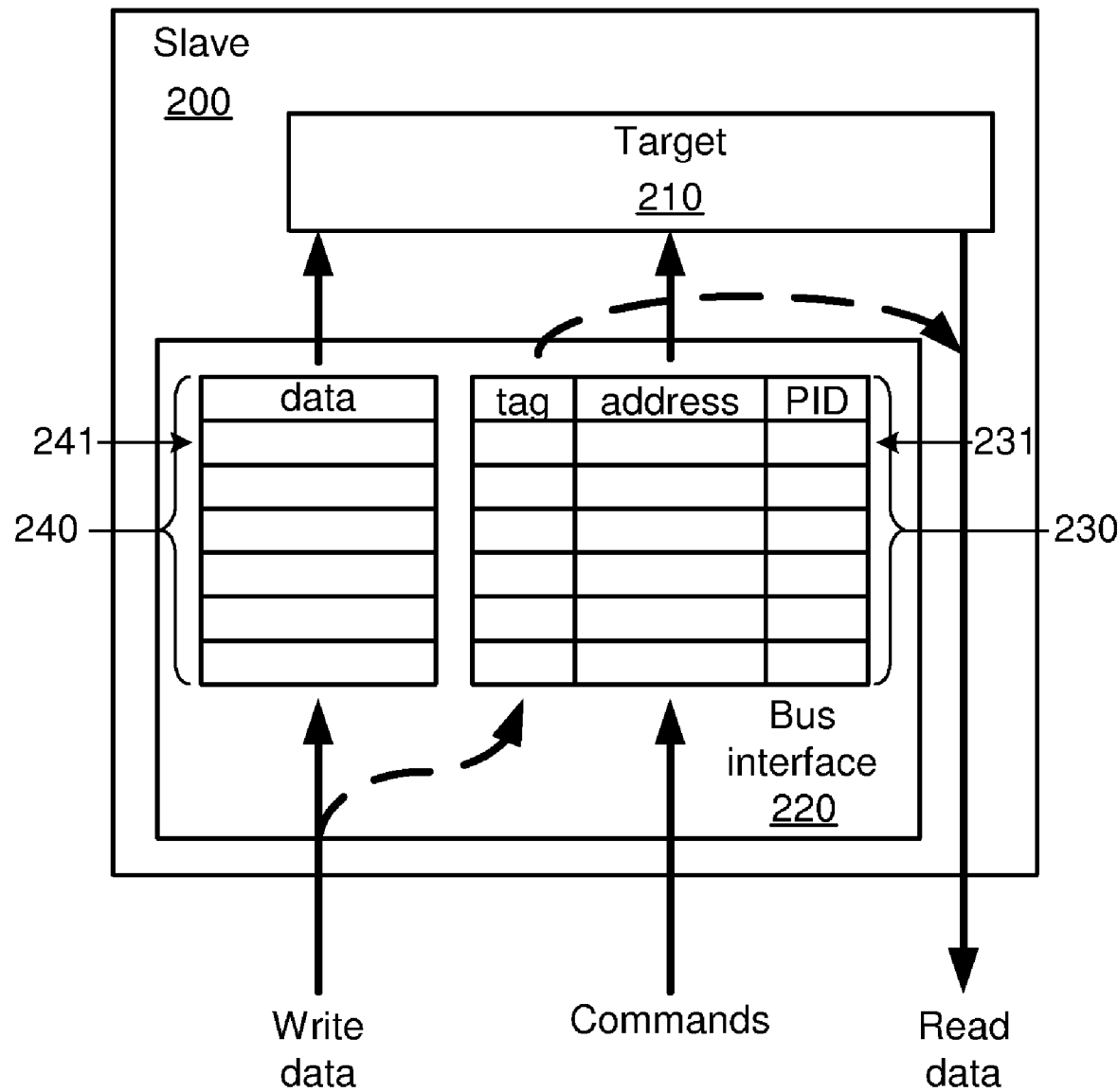
FIG. 2 is a functional block diagram illustrating the structure of a conventional slave device that requires buffer space for storing write data.

Referring to FIG. 2, a functional block diagram illustrating the structure of a conventional slave device that requires buffer space for storing write data is shown. In this figure, slave 200 includes a target device 210 and a bus interface 220. Bus interface 220 contains a command queue 230 and a corresponding data buffer 240, as well as control logic for the queues (not shown.) Each of the entries in command queue 230 can store the parameters of a command, such as a command identifier (e.g., whether the command is a read or a write,) the data address to be read or written, a transaction tag, an identifier of the master that sent the command (e.g., a processor ID, or PID,) and so on. Each of the entries in write data buffer 240 has sufficient space to store data that may be associated with a write command in queue 230. Even though it may not be necessary to store data in data buffer 240 for every command, it is possible that a write command with associated data could be stored in any one of the command queue entries, so each of the associated data buffer entries must be able to store the corresponding data. In this embodiment, each data buffer entry is associated with a corresponding one of the command queue entries (e.g., data buffer entry 241 is associated with command queue entry 231,) and the data in an entry is advanced in the data buffer as the associated command is advanced in the command queue.

It should be noted that, in the slave device depicted in FIG. 2, a single command buffer is used to store both the read and write commands. In some systems, separate read and write command queues are provided. The primary difference between the use of a single command queue versus separate command queues is that data buffer space need only be provided for associated entries in the write queue, since the slave does not read the data from the target until the corresponding read command issues from the command queue, so there is no data to be stored for the non-issued read commands in the queue.

Figure 3:
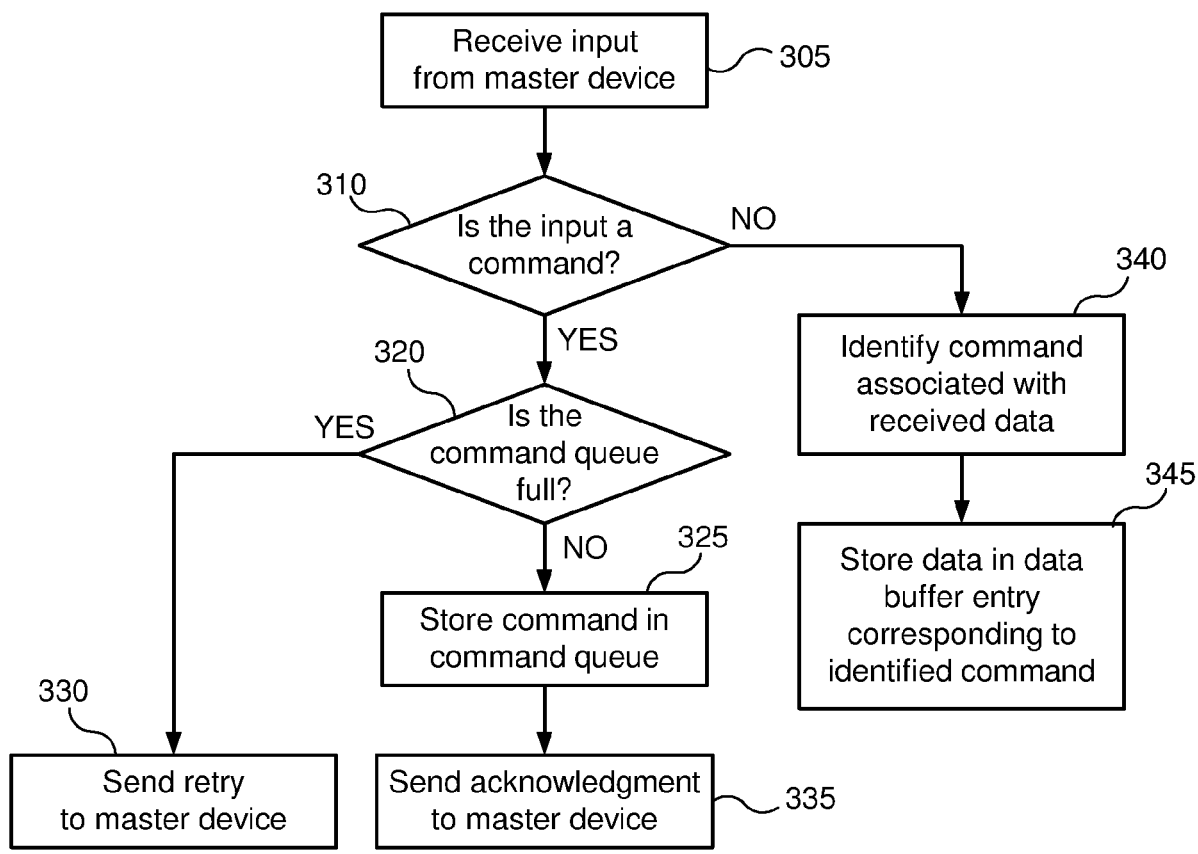
FIG. 3 is a flow diagram illustrating the operation of the slave depicted in FIG. 2.

Referring to FIG. 3, a flow diagram illustrating the operation of the slave depicted in FIG. 2 is shown. When input is received by the slave device (305,) it may be a command or data. If the input is a command, it is first determined whether the command queue is full (320.) If the command queue is full, the command cannot be accepted, and the slave sends a retry to the master (330.) If, on the other hand, the command queue is not full, the slave stores the command in the queue (325) and sends an acknowledgment to the master (335.) If the received input is data (305, 310,) the slave uses the tag included with the data to identify the command with which the data is associated (340) and then stores the data in the data buffer entry corresponding to the entry in the command queue in which the command is stored (345.)

In the present embodiment, the need for buffer space to store data for unissued write commands is eliminated. In the absence of an execution synchronization command (e.g., eieio,) commands in the command queue are allowed to be issued out of order. Thus, whenever data corresponding to a write command in the queue is received, the command is issued and the data is written, so it does not have to be stored in a buffer. If an execution synchronization command is issued, the command is not acknowledged by the slave unless all of the write commands previously sent by the master that sent the synchronization command have been issued. Until the slave acknowledges the execution synchronization command, the master will not send any subsequent write commands, so there will be no data that needs to be buffered by the slave.

Figure 4:
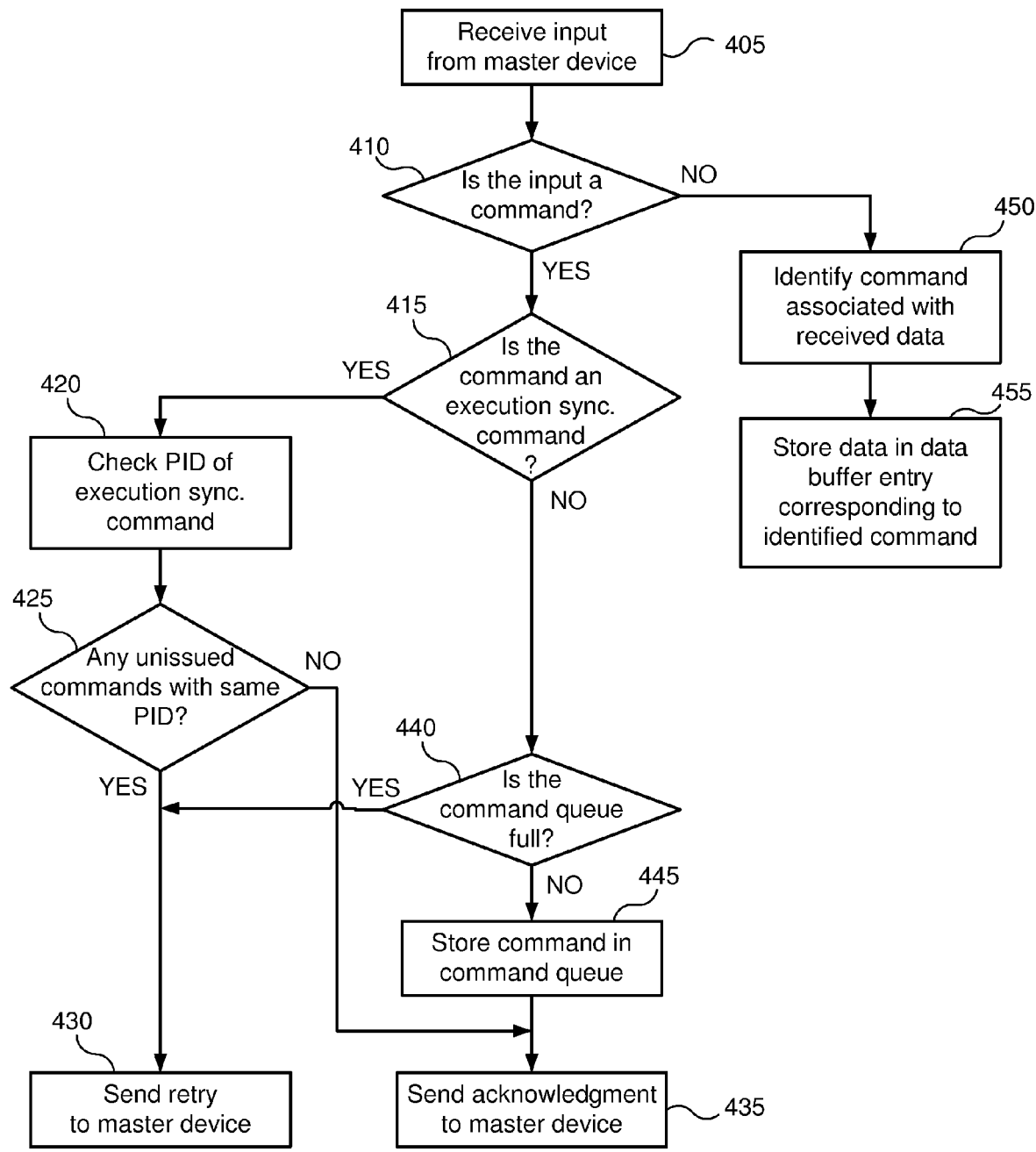
FIG. 4 is a flow diagram illustrating a method summarizing the operation of a slave in accordance with one embodiment.

Referring to FIG. 4, a flow diagram illustrating a method summarizing the operation of a slave in accordance with one embodiment of the invention is shown. In this embodiment, when input is received by the slave (405,) it is determined whether the input is a command or data (410.) If the input is a command, the slave determines whether or not the command is an execution synchronization command (415.) If the command is not an execution synchronization command, the slave checks to see if the command queue is full (440) and, if there is space available, the command is stored in the queue (445.) If the command queue is full, the slave sends a retry to the master (430,) so that the master will try to send the command again later, when there might be open entries in the slave's command queue.

If, at 415, the slave device determines that the received command is an execution synchronization command, the slave will check the processor ID associated with the command (420.) The slave will then determine whether there are any unissued commands in the command queue which have the same processor ID (425.) In other words, the slave will determine whether the command queue contains any commands that were previously sent to the slave by the same master that sent the execution synchronization command. If none of these commands are found in the command queue, the slave will send an acknowledgment to the master (435.) There is no need for the slave device to store the execution synchronization command or take any further action with respect to this command, and any commands that are subsequently sent to the slave by the master can be executed in any order because all of the preceding commands have been issued.

If, at 425, the slave device determines that there are unissued commands in the command queue that have the same processor ID as the execution synchronization command, the slave will send a retry to the master (430.) When the master receives a retry from the slave, the master knows that the execution synchronization command has not been acknowledged, and any commands that are sent to the slave at this point may be issued by the slave out of order. Consequently, the master does not send any of these commands to the slave. Instead, the master will delay for some interval, and then send the execution synchronization command to the slave again. The master will continue to send this command until it is acknowledged by the slave, and only then will it send further read or write commands.

It should be noted that other master devices may continue to send commands to the slave, and the slave may acknowledge and queue up these commands since they do not interfere with the attempts of the first master to enforce in-order execution. These other masters, however, may also be attempting to enforce in-order execution, in which case they will be subject to the same process as the first master.

If the input received by the slave device is data instead of a command, (405, 410,) the slave will use the tag that is sent with the data by the master to identify the command with which the data is associated (450.) Because the slave device can issue the commands in the command queue out of order, the slave can issue the identified command and write the data according to the parameters of the command (455.)

Figure 5:
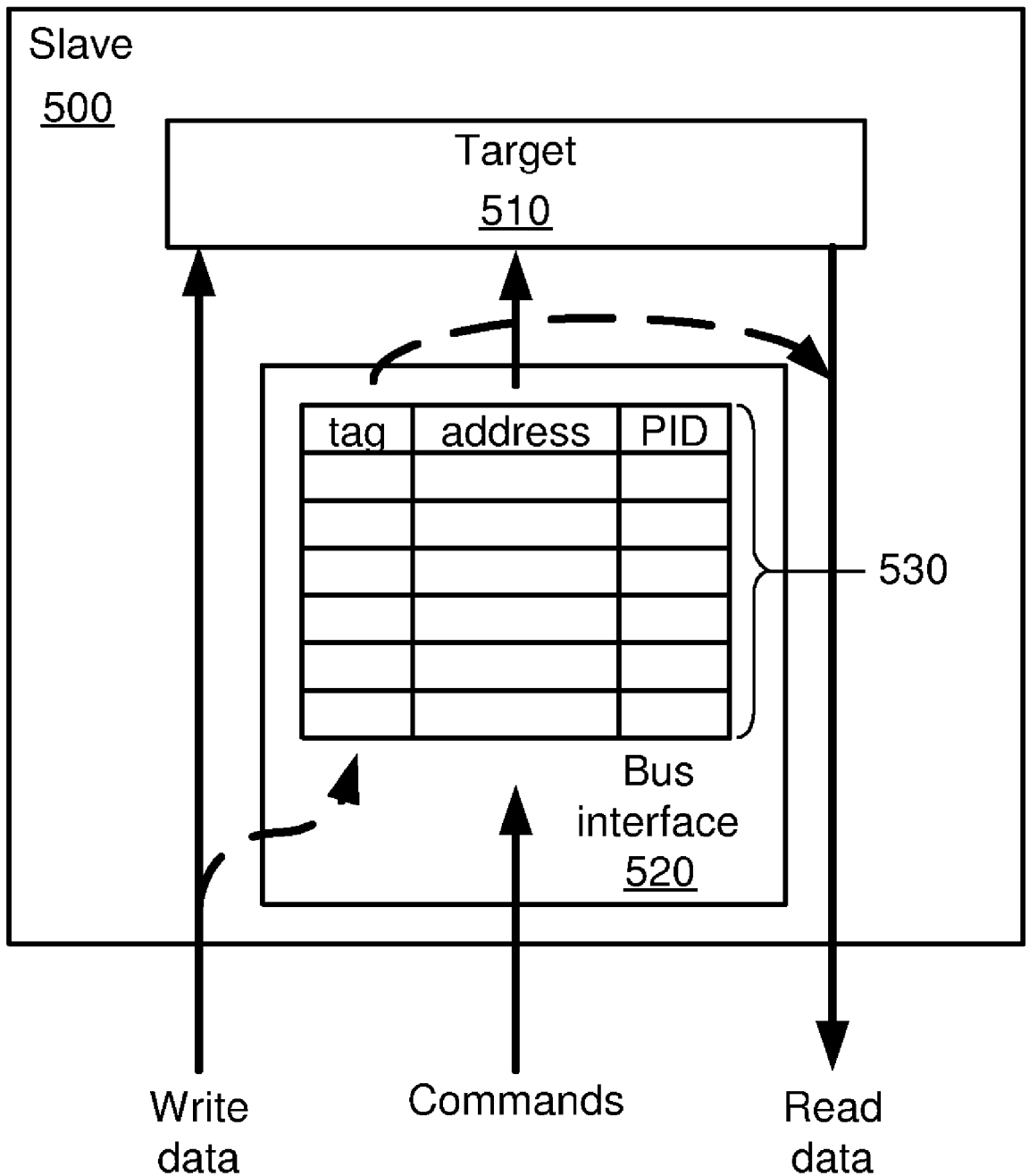
FIG. 5 is a functional block diagram illustrating the structure of a slave device in accordance with one embodiment.

Referring to FIG. 5, a functional block diagram illustrating the structure of a slave device in accordance with one embodiment of the invention is shown. Slave device 500 includes a target 510 and a bus interface 520. Within bus interface 520 is a command queue 530. Slave device 500 also includes control logic (such as the logic that determines whether to send an acknowledgement or a retry in response to a received command) which is not explicitly depicted in the figure. Target 510 is typically a local memory for storing read or write data in accordance with the commands received by slave 500, although it may be some other type of device. Command queue 530 is configured to store commands received by slave 500, as well as associated command parameters, such as an identifier of the type of each command, a data address to be read or written, a transaction tag, an identifier of the master that sent the command, etc. The structure of command queue 530 may be identical to that of the command queue in the prior art structure of FIG. 2 and, as in the structure of FIG. 2, the queue may be either a combined queue configured to store all of the commands or multiple queues. It should be noted that slave 500 does not include buffer space for storing data associated with commands in command queue 530.

As shown in FIG. 5, commands which are received and acknowledged by slave 500 are stored in command queue 530. In the case of some commands, the slave will send a retry to the master instead of an acknowledgment, so these commands obviously will not be stored in command queue 530. For example, if an execution synchronization command is received by slave 500, and there are pending, unissued commands having the same processor ID in the command queue, the slave will send a retry to the master and will not enter the command in queue 530. Although command queue 530 is shown here with fields for a transaction tag, a transaction address and a processor ID, other fields may be desirable in other implementations.

Commands stored in command queue 530 are issued as described above. Read commands, for example, may be issued (in order, or out of order) when target 510 is available to read data. The transaction tag associated with each read command is included with the data when the data is placed on the bus by slave 500. If write data is received by slave 500, the associated transaction tag is used to retrieve the corresponding command from queue 530, and the data is written to target 510.

Figure 6A:
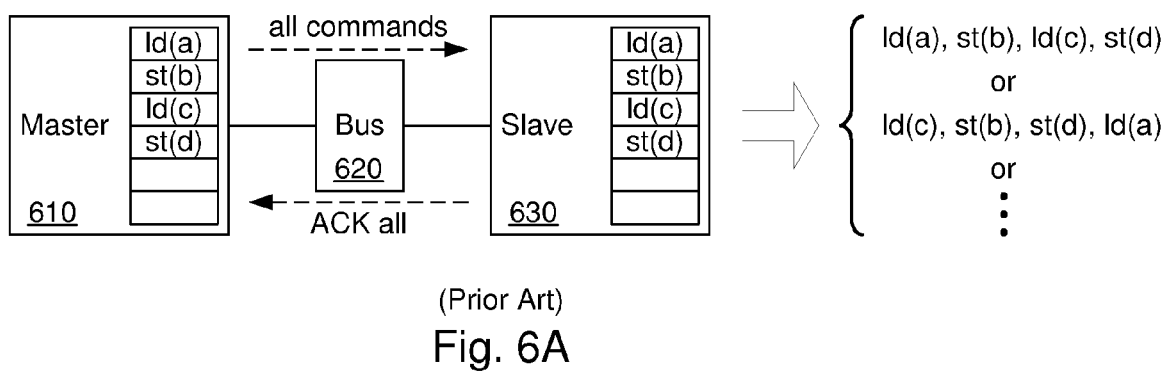
FIGS. 6A-6B are diagrams illustrating several examples of the operation of a conventional slave device.
Figure 6B:
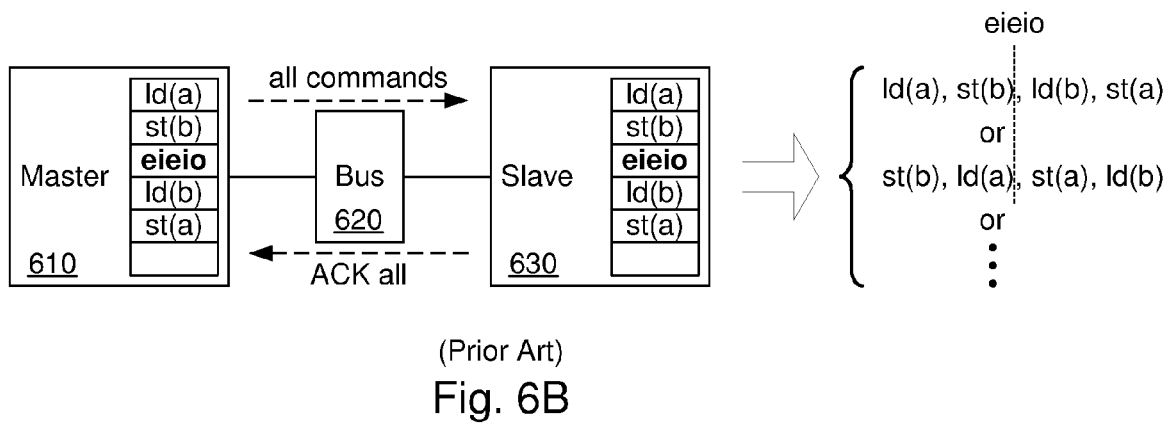
Figure 7A:
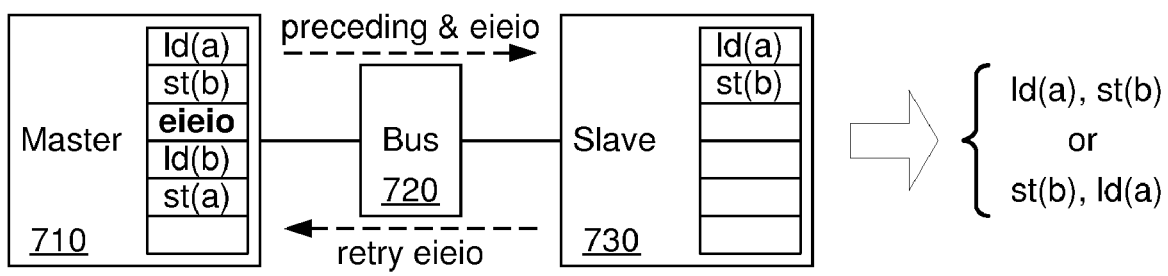
FIGS. 7A-7B are diagrams illustrating several examples of the operation of a slave device in accordance with one embodiment of the invention.
Figure 7B:
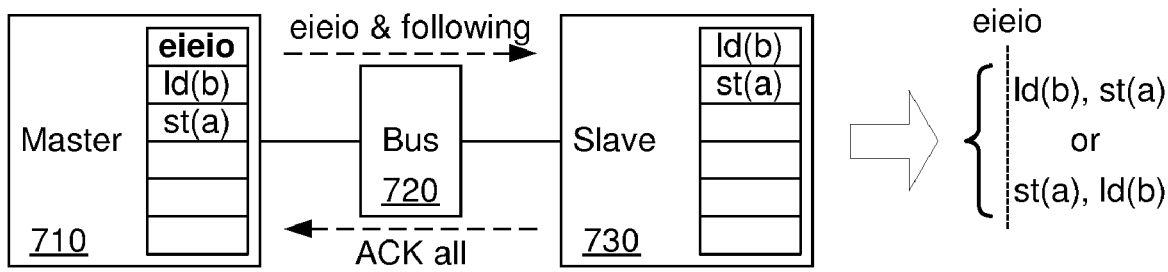

Referring now to FIGS. 6A-6B and 7A-7B, several examples of the operation of a conventional slave device and a slave device in accordance with one embodiment of the invention are shown to illustrate the differences between the operation of the two devices. FIGS. 6A-6B illustrate the operation of the conventional device, while FIGS. 7A-7B illustrate the operation of the present system.

Referring to FIG. 6A, a master device 610 is coupled to a slave device 630 by a bus 620 as described above. Master device 610 has four commands which it needs to send to slave 630 to be serviced. In this instance, all of the commands operate on different data (a, b, c, d.) It is assumed that slave 630 has sufficient space in its command queue to be able to accept all of the commands. Consequently, as each command is sent from master 610 to slave 630, the slave returns an acknowledgment of the command to the master. The commands are therefore stored in the command queue of slave 630 in the order they are received, and are issued by the slave in an appropriate order. The order of issuance of the commands may be the same as their order in the command queue or they may be issued out of order. Several of the possible issue orders are shown at the right side of the figure. (The "or . . . " indicates that still other issue orders are possible.)

Referring to FIG. 6B, the conventional system is again illustrated. In this example, however, two of the commands operate on data (a), while two operate on data (b). Master 610 wishes to have the first two commands (read command ld(a) and write command st(b)) executed before the last two commands (ld(b) and st(a).) Accordingly, master 610 issues an execution synchronization command (eieio) after the first two commands to enforce the desired order of execution. Again, it is assumed that slave 630 has sufficient space to store all of these commands in its command buffer. Consequently, as each command (including the execution synchronization command) is sent by master 610 to slave 630, it is stored in the slave's command queue and an acknowledgment is returned to the master. The commands are therefore stored in the command queue of slave device 630 in the order in which they were sent by master 610. Slave device 630 is then responsible for ensuring that the commands received prior to the execution synchronization command are completed prior to issuance of any of the commands that follow the execution synchronization command.

Several of the possible orders of issuance of the commands by slave device 630 are shown at the right side of the figure. It should be noted that the commands that precede the execution synchronization command may be issued out of order, and the commands that follow the execution synchronization command may also be issued out of order, as long as all of the commands that precede the execution synchronization command are completed before the commands that follow the execution synchronization command are issued.

Referring to FIG. 7A, an example of the operation of the present system is shown. In this example, a master device 710 is coupled to a slave device 730 via a bus 720. Master device 710 wishes to send four commands to slave device 730. These are the same commands illustrated in the example of FIG. 6B. Because master device 710 wishes to complete execution of the first two instructions before the last two instructions are issued, an execution synchronization command (eieio) is sent to slave device 730 between the first two and last two commands. It is assumed that there is sufficient space in the command queue of slave 730 to accommodate all of these commands.

For each of the first two commands, master 710 sends the commands to slave 730, which stores each command in its command queue and returns a corresponding acknowledgment to the master. When master device 710 sends the execution synchronization command to slave 730, the slave checks its command queue to determine whether there are unissued commands from the same master device. In this case, the first two commands received from master device 710 remain in the command queue, so slave device 730 returns a retry to the master in response to the execution synchronization command. Upon receipt of the retry from slave device 730, master device 710 does not send the last two commands to the slave device, but instead waits for a period of time and then re—sends the execution synchronization command to the slave device. Slave device 730 will continue to send retries in response to the execution synchronization command until the previous commands received from master device 710 are completed. The commands preceding the execution synchronization command may be issued by slave device 730 in order, or out of order, as shown at the right side of the figure. After these commands are completed, slave device 730 will respond to the execution synchronization command with an acknowledgment.

Referring to FIG. 7B, the example of FIG. 7A is continued from the point at which the first two commands from master 710 have been completed, and there are no more commands from the master in the command queue of slave device 730. Now, when master device 710 sends the execution synchronization command to slave device 730, the slave device returns an acknowledgment to the master device. Because there are no preceding commands from master device 710 in the command queue, it is not necessary to store the execution synchronization command in the command queue. When master device 710 receives the acknowledgment of the execution synchronization command, it proceeds to send the last two commands to slave 730. As each of these commands is received by slave 730, it is stored in the command queue and a corresponding acknowledgment is returned to master 710. The commands may then be issued by slave 730 from the command queue in any order, as shown at the right side of the figure.

It should be noted that, if no execution synchronization command is issued in the present system, the system will operate in essentially the same manner as illustrated for the prior assist them in FIG. 6A. In other words, the commands stored in the command queue of slave device 730 may be issued either in the order in which they are entered into the queue, or out of order.

The foregoing description relates to exemplary embodiments which are intended to be illustrative, rather than limiting of the invention. Many variations on the above embodiments will be apparent to persons of skill in the art of the invention upon reading the present disclosure. For example, in one embodiment, rather than causing the master to delay sending commands after the execution synchronization command by returning a retry to the master, the slave could be configured to simply delay returning an acknowledgment of the execution synchronization command until the preceding commands are issued from the slave's command queue. Such variations are intended to be within the scope of the invention as defined in claims below.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields, or any combination thereof.

Those of skill will further appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A method comprising:
a slave device receiving an execution synchronization command, wherein the execution synchronization command preserves order of execution between instructions preceding the execution synchronization command and instructions following the execution synchronization command, wherein the execution synchronization command includes a processor identifier of a master device from which the execution synchronization command was received;
the slave device determining whether the command queue in the slave device contains unissued commands associated with the execution synchronization command by determining whether any unissued commands in the command queue contain the processor identifier;
the slave issuing a retry responsive to the execution synchronization command when the command queue in the slave device contains unissued commands associated with the execution synchronization command; and
the slave issuing an acknowledgment responsive to the execution synchronization command only when the command queue in the slave device does not contain unissued commands associated with the execution synchronization command.

2. The method of claim 1, further comprising the slave device determining whether a command queue in the slave device contains unissued commands associated with the execution synchronization command by determining a master device from which the execution synchronization command was received and determining whether any commands in the command queue in the slave device were received from the master device.

3. The method of claim 1, further comprising the slave device discarding the execution synchronization command upon issuing the acknowledgment responsive to the execution synchronization command.

4. The method of claim 1, further comprising the slave device issuing commands from the command queue out of order.

5. The method of claim 4, wherein the commands in the command queue comprise at least one write command, the method further comprising issuing the write command upon receiving data associated with the write command.

6. The method of claim 4, wherein the commands in the command queue comprise at least one read command, the method further comprising issuing the read command and returning data retrieved according to the read command to the master device.

7. The method of claim 1, further comprising the slave device receiving a non-execution-synchronization command, determining whether an entry is available in the command queue to store the non-execution-synchronization command, and issuing either an acknowledgment responsive to the non-execution-synchronization command if the entry is available in the command queue or a retry responsive to the non-execution-synchronization command if no entry is available in the command queue.

8. The method of claim 1, further comprising a master device sending the execution synchronization command to the slave device.

9. The method of claim 8, further comprising the master device receiving the retry responsive to the execution synchronization command and re-sending the execution synchronization command to the slave device.

10. The method of claim 9, further comprising the master device waiting for a delay period following receipt of the retry responsive to the execution synchronization command before re-sending the execution synchronization command to the slave device.

11. A system comprising:
a slave device including
a command queue configured to store commands received from a master device, including an execution synchronization command, wherein the execution synchronization command preserves order of execution between instructions preceding the execution synchronization command and instructions following the execution synchronization command, wherein the execution synchronization command includes a processor identifier of a master device from which the execution synchronization command was received; and control logic configured to > determine upon receipt of the execution synchronization command whether the command queue contains unissued commands associated with the execution synchronization command by determining whether any unissued commands in the command queue contain the processor identifier,
>
> issue a retry responsive to the execution synchronization command when the command queue in the slave device contains unissued commands associated with the execution synchronization command, and
>
> issue an acknowledgment responsive to the execution synchronization command only when the command queue in the slave device does not contain unissued commands associated with the execution synchronization command.

12. The system of claim 11, wherein the control logic is configured to identify a master device from which the execution synchronization command was received and determine whether any commands in the command queue in the slave device were received from the identified master device.

13. The system of claim 11, wherein the control logic is configured to discard the execution synchronization command upon issuing the acknowledgment responsive to the execution synchronization command.

14. The system of claim 11, wherein the control logic is configured to issue commands from the command queue out of order.

15. The system of claim 14, wherein the commands in the command queue comprise at least one write command, and wherein the control logic is configured to issue the write command upon receipt of data associated with the write command.

16. The system of claim 14, wherein the commands in the command queue comprise at least one read command, and wherein the control logic is configured to issue the read command and return data retrieved according to the read command to the master device.

17. The system of claim 11, wherein the control logic is configured to determine upon receipt of a non-execution-synchronization command whether an entry is available in the command queue to store the non-execution-synchronization command, and issue either an acknowledgment responsive to the non-execution-synchronization command if the entry is available in the command queue or a retry responsive to the non-execution-synchronization command if no entry is available in the command queue.

18. The system of claim 11, further comprising a master device which is configured to send commands including the execution synchronization command to the slave device.

19. The system of claim 18, wherein the master device configured to re-send the execution synchronization command to the slave device in response to receiving the retry.

20. The system of claim 19, wherein the master device is configured to wait for a delay period following receipt of the retry before re-sending the execution synchronization command to the slave device.

* * * * *

UNITED STATES PATENT AND TRADEMARK OFFICE
CERTIFICATE OF CORRECTION

PATENT NO. : 7,613,841 B2
APPLICATION NO. : 11/422646
DATED : November 3, 2009
INVENTOR(S) : Asano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 382 days.

Signed and Sealed this

Nineteenth Day of October, 2010

David J. Kappos
*Director of the United States Patent and Trademark Office*